United States Patent
Keshavan et al.

(10) Patent No.: US 10,276,194 B2
(45) Date of Patent: Apr. 30, 2019

(54) SPLIT-SHAFT PIVOT WITH INTERFACE SPACER FOR A DUAL-ACTUATOR HARD DISK DRIVE

(71) Applicant: Western Digital Technologies, Inc., San Jose, CA (US)

(72) Inventors: Manoj Keshavan, San Jose, CA (US); Jung-Seo Park, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/629,100

(22) Filed: Jun. 21, 2017

(65) Prior Publication Data
US 2018/0374513 A1   Dec. 27, 2018

(51) Int. Cl.
*G11B 5/48* (2006.01)
*G11B 21/02* (2006.01)

(52) U.S. Cl.
CPC ............ *G11B 5/4813* (2013.01); *G11B 21/02* (2013.01)

(58) Field of Classification Search
None
See application file for complete search history.

(56) References Cited

U.S. PATENT DOCUMENTS

| | | | |
|---|---|---|---|
| 5,666,242 A | 9/1997 | Edwards et al. | |
| 5,761,007 A | 6/1998 | Price et al. | |
| 5,914,837 A * | 6/1999 | Edwards | F16C 27/066 360/265.6 |
| 5,920,441 A | 7/1999 | Cunningham et al. | |
| 5,930,071 A | 7/1999 | Back | |
| 6,005,743 A | 12/1999 | Price et al. | |
| 6,191,924 B1 * | 2/2001 | Koester | G11B 5/4813 360/250 |
| 6,256,173 B1 * | 7/2001 | Chee | G11B 5/4813 360/265.6 |
| 6,449,130 B1 * | 9/2002 | Koyama | G11B 5/4813 360/264.4 |
| 6,480,363 B1 | 11/2002 | Prater | |

(Continued)

OTHER PUBLICATIONS

Dual Actuator tuned mass damper pivot bearing, IP.com database, original publication date: Feb. 1, 2010, included in prior art database: Jun. 18, 2003, 2 pages, IP.com disclosure No. IPCOM000013589D, IP.com I, LLC.

*Primary Examiner* — William J Klimowicz
(74) *Attorney, Agent, or Firm* — John D. Henkhaus

(57) ABSTRACT

A split-shaft pivot assembly for a dual-actuator data storage device may include a first pivot shaft around which a first bearing assembly is affixed, a second pivot shaft around which a second bearing assembly is affixed, and whereby the two pivot shafts are coupled together by way of an interface spacer between the shafts. The interface spacer may include a receiving structure at each end of a housing, for receiving an end of a respective shaft, and an annular slot circumscribing the housing between the receiving structures, where an elastomeric damper is positioned within the slot. The interface spacer housing may be composed of a material having a lower elastic modulus than the material of which the shafts are composed, thereby making the interface spacer relatively compliant. Such features may serve to inhibit and/or damp transmission of vibrational energy among the actuators through the shared split-shaft.

28 Claims, 13 Drawing Sheets

(56) References Cited

U.S. PATENT DOCUMENTS

| | | |
|---|---|---|
| 6,490,138 B1 | 12/2002 | Prater |
| 6,560,075 B2 | 5/2003 | Price et al. |
| 6,603,640 B1 | 8/2003 | Prater et al. |
| 6,687,092 B2 | 2/2004 | Kan et al. |
| 6,747,836 B2 | 6/2004 | Stevens et al. |
| 6,847,504 B1 | 1/2005 | Bennett et al. |
| 6,961,212 B1 | 11/2005 | Gustafson et al. |
| 7,428,125 B2 * | 9/2008 | Deguchi ................ F16C 19/56 310/90 |
| 7,469,463 B2 | 12/2008 | Prater et al. |
| 7,513,030 B2 | 4/2009 | Aoyagi et al. |
| 7,750,520 B2 * | 7/2010 | Smirnov ................ F16C 17/02 310/90 |
| 2002/0149884 A1 | 10/2002 | Price et al. |
| 2003/0156358 A1 | 8/2003 | Jeong |
| 2004/0095672 A1 | 5/2004 | Price |
| 2005/0248877 A1 | 11/2005 | Kim |

* cited by examiner

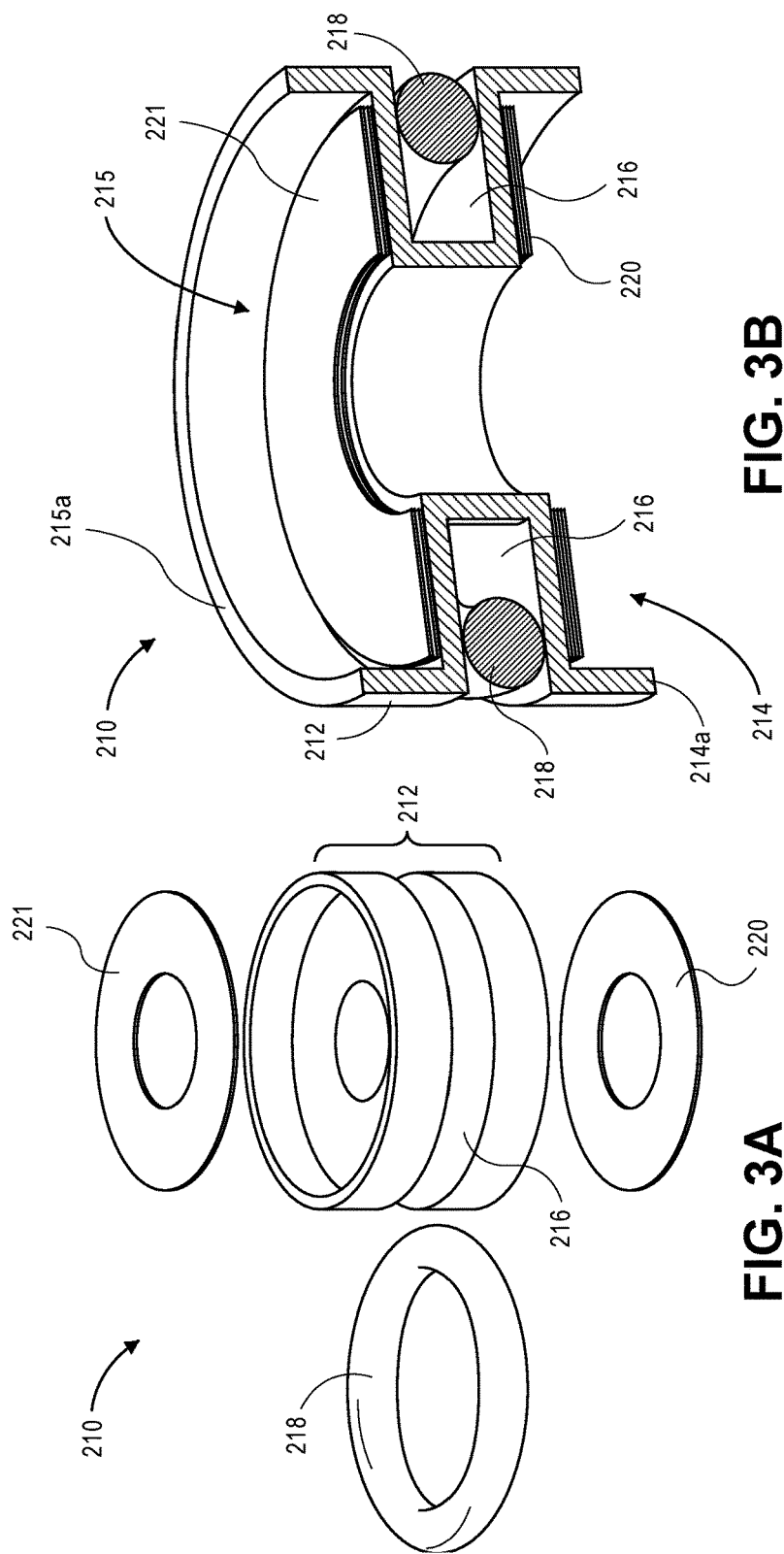

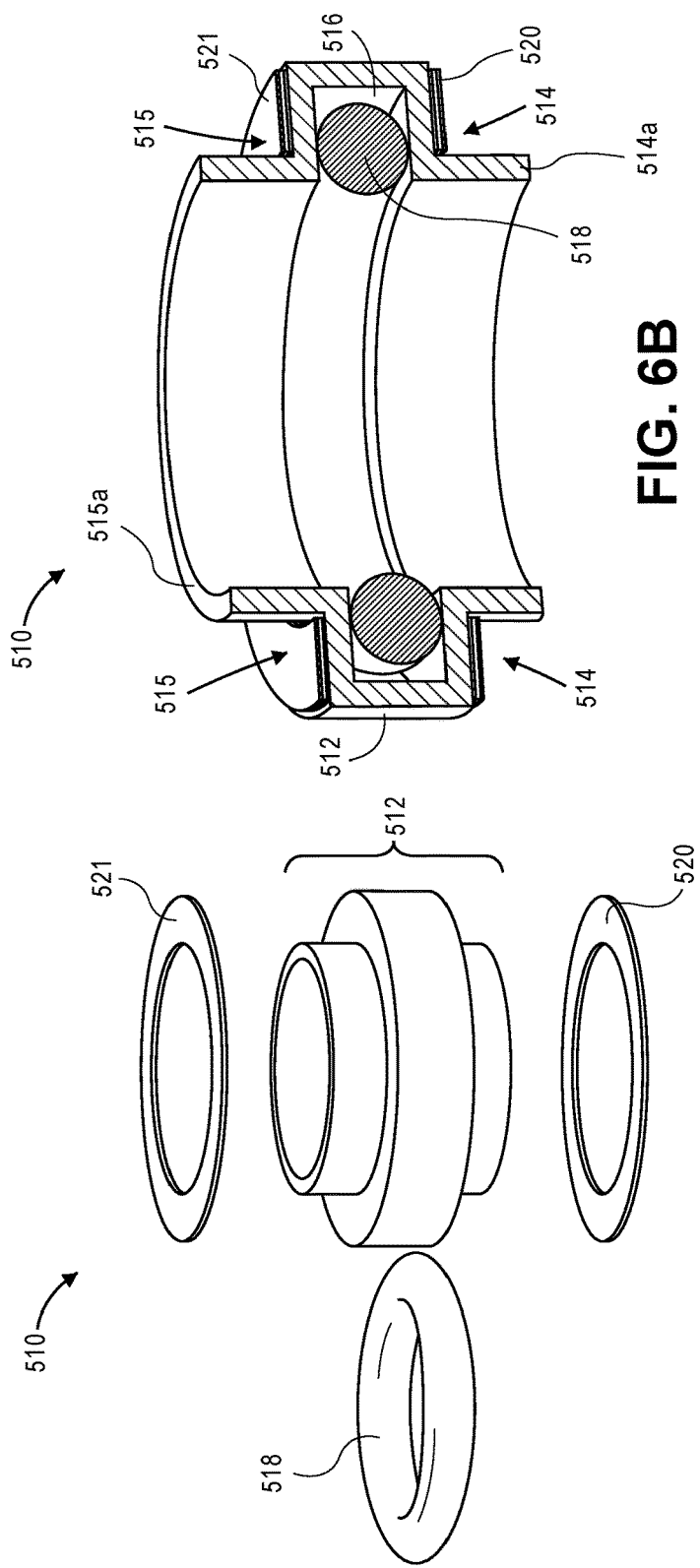

SPLIT-SHAFT PIVOT WITH INTERFACE SPACER FOR A DUAL-ACTUATOR HARD DISK DRIVE

FIELD OF EMBODIMENTS

Embodiments of the invention may relate generally to data storage devices such as hard disk drives, and particularly to managing transmission of vibration in a dual-actuator disk drive utilizing a split-shaft pivot.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

Increasing areal density (a measure of the quantity of information bits that can be stored on a given area of disk surface) is one of the on-going goals of hard disk drive technology evolution. In one form, this goal manifests in the type of high-capacity HDDs that are especially attractive in the context of enterprise, cloud computing/storage, and data center environments. However, the performance of high-capacity HDDs has not necessarily scaled up commensurately with the increases in capacity. This has led to the need to develop and implement various means to increase HDD performance.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 3A is an exploded perspective view illustrating an interface spacer assembly, according to an embodiment;

FIG. 3B is a cross-sectional perspective view illustrating the interface spacer assembly of FIG. 3A, according to an embodiment;

FIG. 6A is an exploded perspective view illustrating an interface spacer assembly, according to an embodiment;

FIG. 6B is a cross-sectional perspective view illustrating the interface spacer assembly of FIG. 6A, according to an embodiment;

DETAILED DESCRIPTION

Generally, approaches to managing vibration associated with a dual-actuator split-shaft pivot assembly are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a digital data storage device (DSD), such as a hard disk drive (HDD). Thus, in accordance with an embodiment, a plan view illustrating an HDD 100 is shown in FIG. 1 to illustrate an exemplary operating context.

Figure 1:
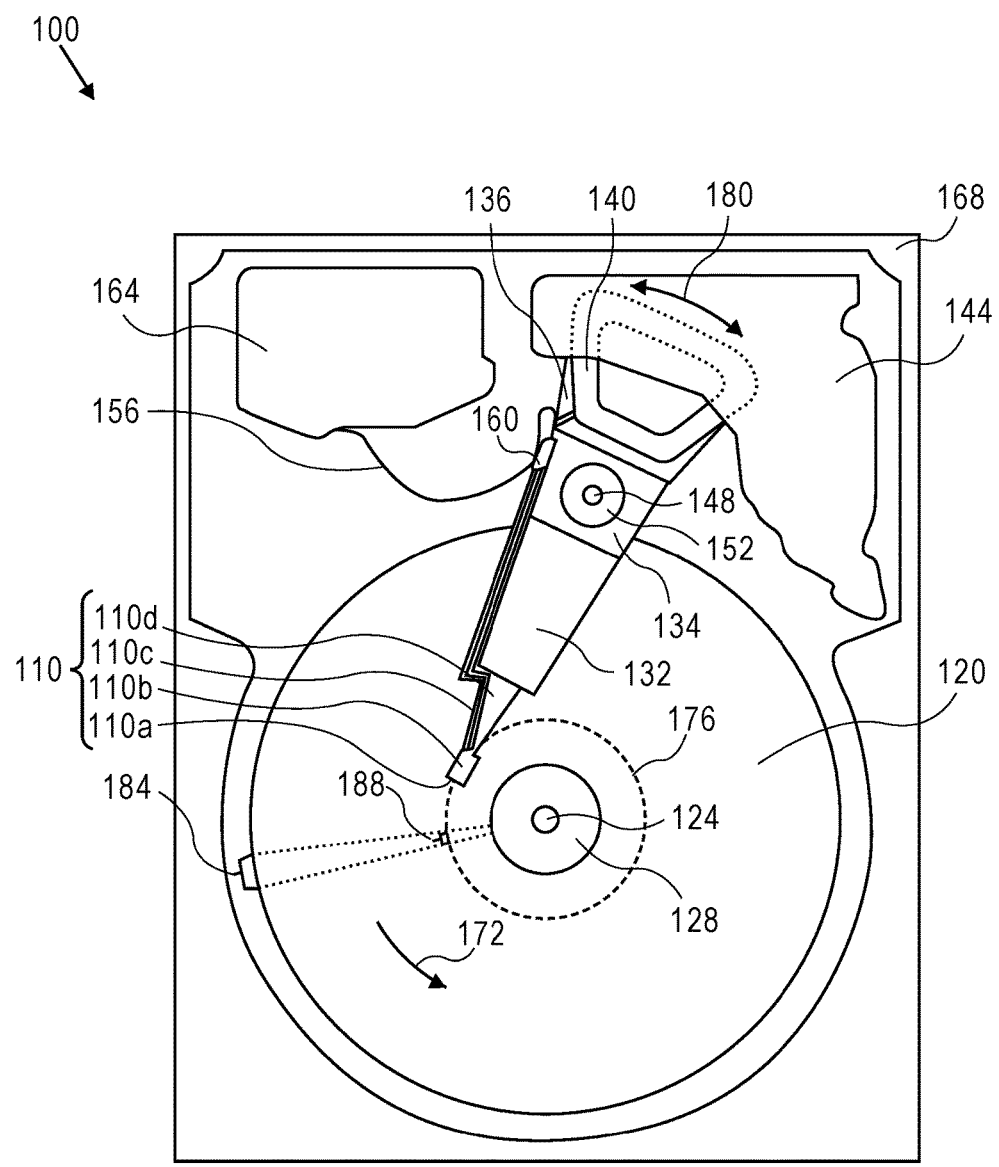
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to rotate the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

Recall the observation that the performance of high-capacity HDDs has not scaled up commensurately with increases in storage capacity. This IOPs/TB (referred to as "IOPs density") deficit stands in the way of widespread adoption of such HDDs. In other words, the high latencies of large capacity HDDs in a clustered environment, such as in data centers with multiple clustered nodes, limits their appeal due to slower access to stored data. The pressure to increase the performance (e.g., IOPs/TB) by reducing the latencies for data operations of high-capacity HDDs has become even stronger in view of the market penetration that solid-state storage continues to achieve.

One possible approach to increasing HDD performance is the implementation of multi-actuator systems, in which multiple independently operating actuators are assembled onto a single shared pivot shaft in order to independently and concurrently read from and/or write to multiple recording disks of a disk stack. However, the operation of multiple actuators on a shared pivot shaft can structurally couple the vibration modes of the independently operating actuators, leading to the transfer of vibrational energy between actuators by way of the shared shaft. That is, operation (i.e., rotary movement) of one actuator generates forces that transfer via the shared shaft to the other actuator(s). This vibration transferred to the other actuator(s) affects the ability of the corresponding read-write transducer (or "head") to efficiently arrive at and to stay on-track, resulting in excessive track mis-registration ("TMR"). TMR limits the performance of HDDs in that an inordinate amount of time is expended trying to position and maintain the head well-centered over a data track (e.g., via servoing). The corresponding read and write operations are effectively delayed as a result, thus reducing overall I/O performance.

The number of actuators that may be assembled onto a shared pivot shaft may vary from implementation to implementation; however, an exemplary but non-limiting dual-actuator arrangement is described throughout herein.

Dual-Actuator Split-Shaft Actuator System with Compliant Interface Spacer

One challenge with vibration transmission alluded to above pertains to reducing the structural dynamics coupling of actuator system modes between the two actuator systems. According to an embodiment, one approach to reducing the dynamic coupling between actuator systems in a dual-actuator configuration is to utilize a relatively compliant interface spacer between shafts of a split-shaft assembly, to effectively isolate the actuator systems from each other to reduce or minimize transmission of vibration from one actuator system to the other.

Figure 2A:
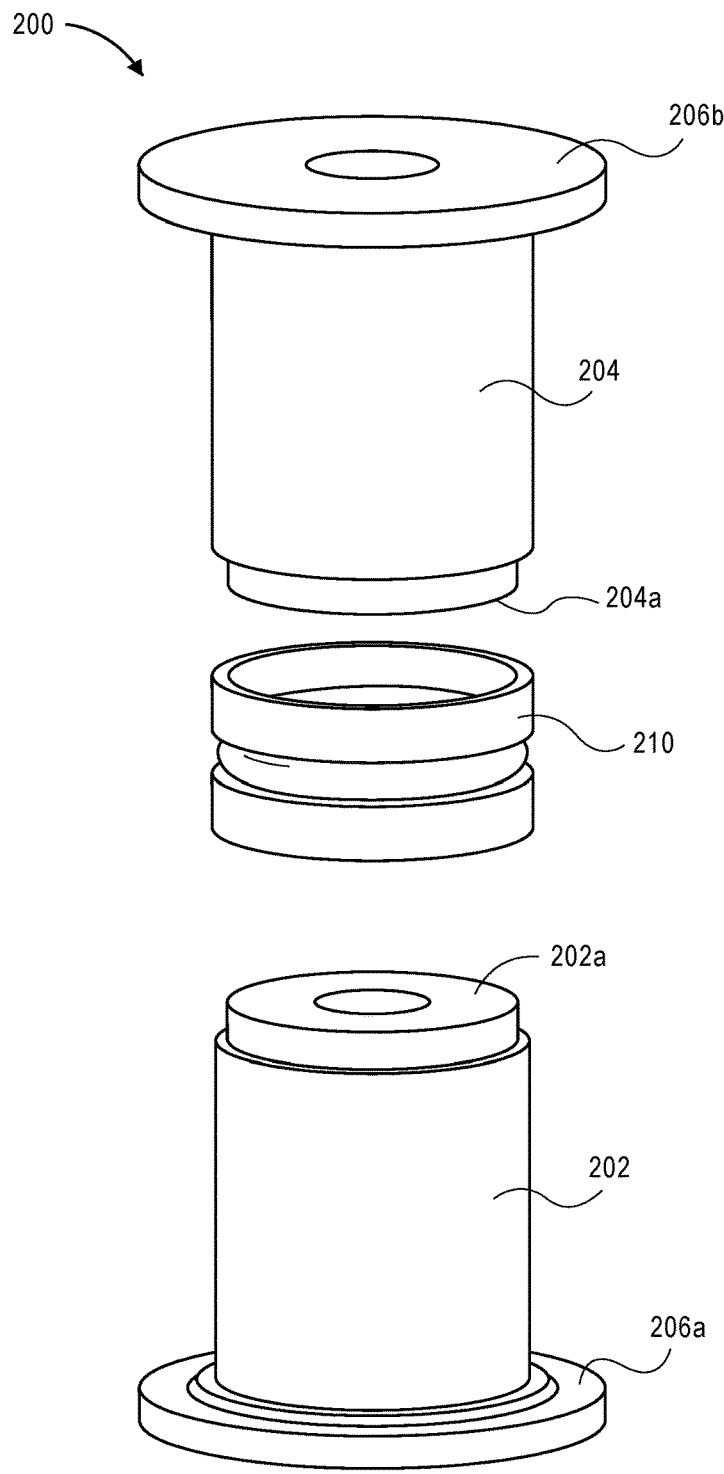
FIG. 2A is an exploded perspective view illustrating a split-shaft assembly with an interface spacer assembly, according to an embodiment.
Figure 2B:
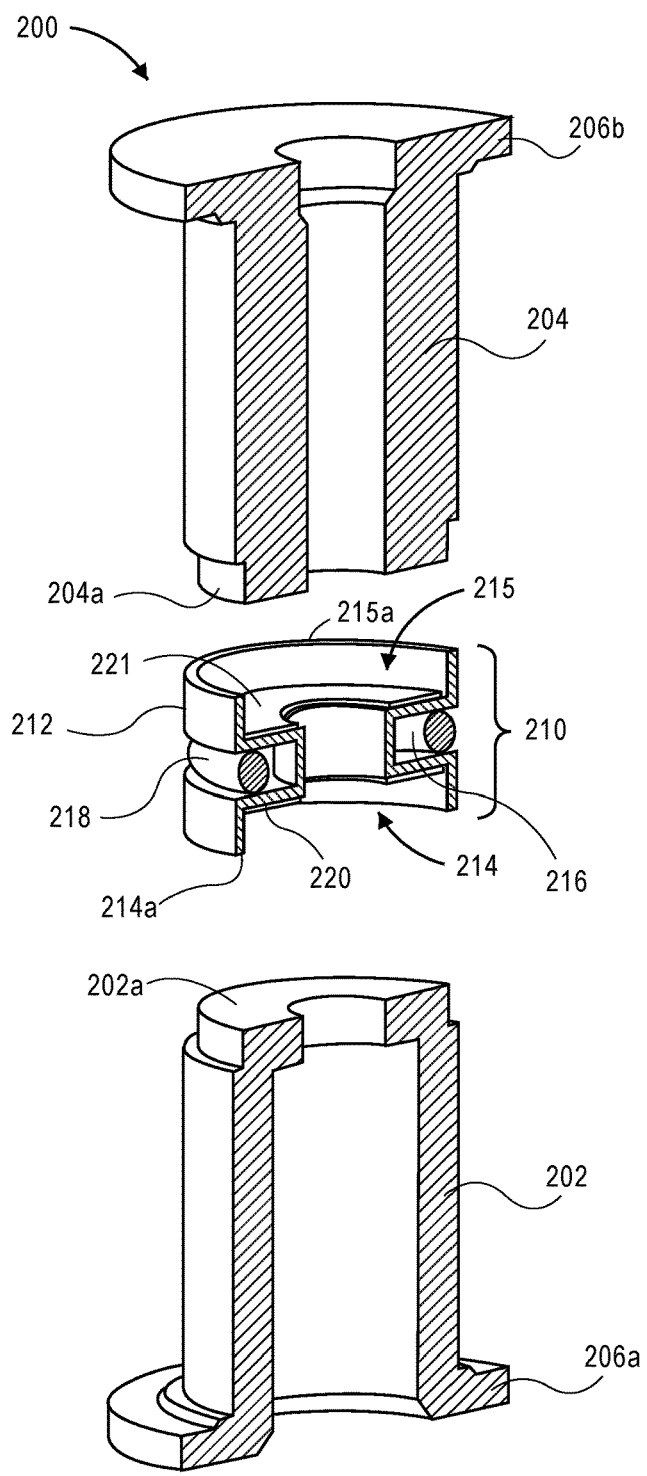
FIG. 2B is an exploded cross-sectional perspective view illustrating the split-shaft assembly with interface spacer assembly of FIG. 2A, according to an embodiment.

FIG. 2A is an exploded perspective view illustrating a split-shaft assembly with an interface spacer assembly, and FIG. 2B is an exploded cross-sectional perspective view illustrating the split-shaft assembly with interface spacer assembly of FIG. 2A, according to an embodiment. An actuator pivot assembly, such as split-shaft assembly 200, may be implemented for use in a data storage device such as a multi-actuator hard disk drive (HDD).

According to an embodiment, split-shaft assembly 200 (or "split-shaft pivot") comprises a first (e.g., lower) pivot shaft 202 part and a second (e.g., upper) pivot shaft 204 part. The first pivot shaft 202 and the second pivot shaft 204 are intended for coupling together as a split-shaft assembly or unit, e.g., for enabling a dual-actuator system. According to an embodiment, the first pivot shaft 202 and the second pivot shaft 204 comprise the same part, e.g., the first pivot shaft 202 and the second pivot shaft 204 are substantially equivalent because each is fabricated according to the same design.

According to an embodiment, the split-shaft pivot 200 is mounted within a disk drive by way of a post that extends from the enclosure base and that is threaded at the top. A top screw is placed through the cover and threaded into the post, which compresses the cover against the upper pivot shaft 204. The force is transmitted from the upper pivot shaft 204 to the lower pivot shaft 202, and clamps the two pivot shafts 202, 204 together in the process. According to an embodiment, the attachment flange 206a and the attachment flange 206b are (substantially) structurally equivalent or structurally symmetric. Thus, when the first pivot shaft 202 is coupled with an HDD enclosure base (e.g., base or housing 168 of FIG. 1) with support from the lower attachment flange 206a, and the second pivot shaft 204 is coupled with an HDD cover with support from the upper attachment flange 206b, a higher degree of stiffness symmetry can be achieved at the base and cover interfaces as compared to using asymmetric flanges. Such stiffness symmetry at the attachment boundaries can assist with inhibiting undesirable modes such as tilt modes of the actuators wherein the displacement gain at the head 110a varies depending on the position in the HSA.

According to an embodiment, split-shaft assembly 200 further comprises a compliant interface spacer 210 coupled with and between the first and second pivot shafts 202, 204. According to an embodiment, the interface spacer 210 is a separate component from each of the first and second pivot shafts 202, 204. According to an embodiment, the interface spacer 210 may be considered "compliant" at least in part because it is composed of a different material than the first and second pivot shafts 202, 204 for which the interface spacer 210 is used to couple. For example and according to an embodiment, each of the first and second shaft 202, 204 is composed of a first material having a first elastic modulus and the housing (see, e.g., housing 212 of FIGS. 3A, 3B) of the interface spacer 210 is composed of a second material having a second elastic modulus that is lower than the first elastic modulus. For example and according to an embodiment, the first pivot shaft 202 and the second pivot shaft 204 are each made primarily of steel and the housing 212 of interface spacer 210 is made primarily of aluminum. Alternatively, according to an embodiment, the interface spacer 210 may be composed of the same material as the first and second pivot shafts 202, 204 (e.g., in order to match the respective coefficients of thermal expansion of the components), where the interface spacer 210 is considered "compliant" (e.g., its stiffness is managed or reduced) based on its wall thickness.

FIG. 3A is an exploded perspective view illustrating an interface spacer assembly, and FIG. 3B is a cross-sectional perspective view illustrating the interface spacer assembly of FIG. 3A, according to an embodiment. According to an embodiment, the interface spacer 210 comprises an annular housing 212 (or "housing 212") that may have a bore therethrough. The housing 212 comprises a first receiving structure 214 (or "receptacle") at one end, for receiving an end 202a or extension of the first (e.g., lower) pivot shaft 202, and a second receiving structure (or "receptacle") 215 at another opposing end of the housing 212, for receiving an end 204a or extension of the second pivot shaft 204. The housing 212 further comprises an annular slot 216 or channel circumscribing the housing 212 (or bore), between the first and second receiving structures 214, 215. As such, the annular slot 216 extends inward toward the center bore (e.g., as depicted in FIGS. 2B, 3B), and each first and second receiving structure 214, 215 comprises an outer wall 214a, 215a (e.g., as depicted in FIGS. 2B, 3B), for mechanically supporting the reception of end 202a and the end 204a, respectively.

According to an embodiment, the interface spacer 210 further comprises an elastomeric damper 218 (e.g., an O-ring) positioned within the annular slot 216 and between the first and second receiving structures 214, 215, and is pre-compressed during assembly (where a non-limiting compression target may range from 10% to 30%). An appropriate elastomeric material may be selected based on, for non-limiting examples, desired damping characteristics over a desired frequency range and temperature range (e.g., based on loss factor), cleanliness requirements (e.g., considering outgassing), elasticity (e.g., based on shear modulus), and the like. Such an elastomeric damper 218 may serve to dissipate energy from cyclic deformation (e.g., bending) of the pivot shaft 200 in response to operational vibrational forces and shock events, for example. As such, deformation of the compliant interface spacer 210 (e.g., deflection of the housing 212) is likely to cause strain variations in the elastomeric damper 218, which serves to dissipate vibrational energy within the elastomer as heat.

According to an embodiment, the interface spacer 210 further comprises a first viscoelastic damper 220 disposed in the first receiving structure 214 and mechanically interfacing with the first pivot shaft 202, and a second viscoelastic damper 221 disposed in the second receiving structure 215 and mechanically interfacing with the second pivot shaft 204. Each of the first and second viscoelastic dampers 220, 221 provide additional damping at the interface, e.g., functioning as constrained layer dampers, generally, between the housing 212 of the interface spacer 210 and each respective end 202a, 204a of the first and second pivot shafts 202, 204. According to an embodiment, one or more viscoelastic damper 220, 221 comprises a laminate structure comprising a steel annulus coupled with a viscoelastic adhesive (e.g., a pressure-sensitive adhesive, or "PSA") on each side, used to attach the interface spacer 210 to the end 202a, 204a of each of the first and second pivot shafts 202, 204. An appropriate viscoelastic material may be selected based on, for non-limiting examples, desired damping characteristics over a desired frequency range and temperature range (e.g., based on loss factor), cleanliness requirements (e.g., considering outgassing), and the like. Further, according to an embodiment, the viscoelastic adhesive employed on one side of the steel annulus may be different, and thus have different characteristics and qualities, than the viscoelastic adhesive employed on the other side of the steel annulus.

Dual-Actuator Split-Shaft Actuator Bearing Assemblies

One challenge with vibration transmission alluded to above pertains to the coupling of actuator system modes, e.g., when primary butterfly modes of the individual actuators overlap, or are in close proximity to one another. Typically, a butterfly mode involves significant deformation of the arms of the E-block, coil and pivot bearing assembly, with all the arms moving in phase with one another. In scenarios where respective butterfly mode resonant frequencies of each actuator system (considered separately) are clustered together, the modes couple and assume a global or extended form. Vibrational energy is then efficiently transmitted from one actuator to the other at these "combined system" resonant frequencies. This scenario would play out in cases in which one actuator is seeking, while the other actuator is transferring data from/to disk. The actuator that is seeking would excite the combined system modes and increase the vibration level in the actuator transferring data, leading to a detrimental effect on system performance. Further, in those scenarios where the butterfly mode resonant frequencies of the individual actuator systems (considered separately) are close, a "beating" phenomenon could also occur between the now global (extended) modes of the combined system of actuators. The resulting motion can expose the actuator transferring data to/from disk to sudden excursions leading to off-track writes (poor data integrity) or degraded read performance.

According to an embodiment, one approach to managing or controlling the dynamic coupling of primary system modes between actuators in a dual-actuator system is to employ a split-shaft assembly, and to separate or increase the separation between the dominant system modes. This has the effect of reducing the gains in the coupling transfer function. This may be achieved, in part, by utilizing different pivot bearing preloads on each of the bearing systems, thereby manifesting as a different stiffness for each of the pivot bearing systems.

Figure 4A:
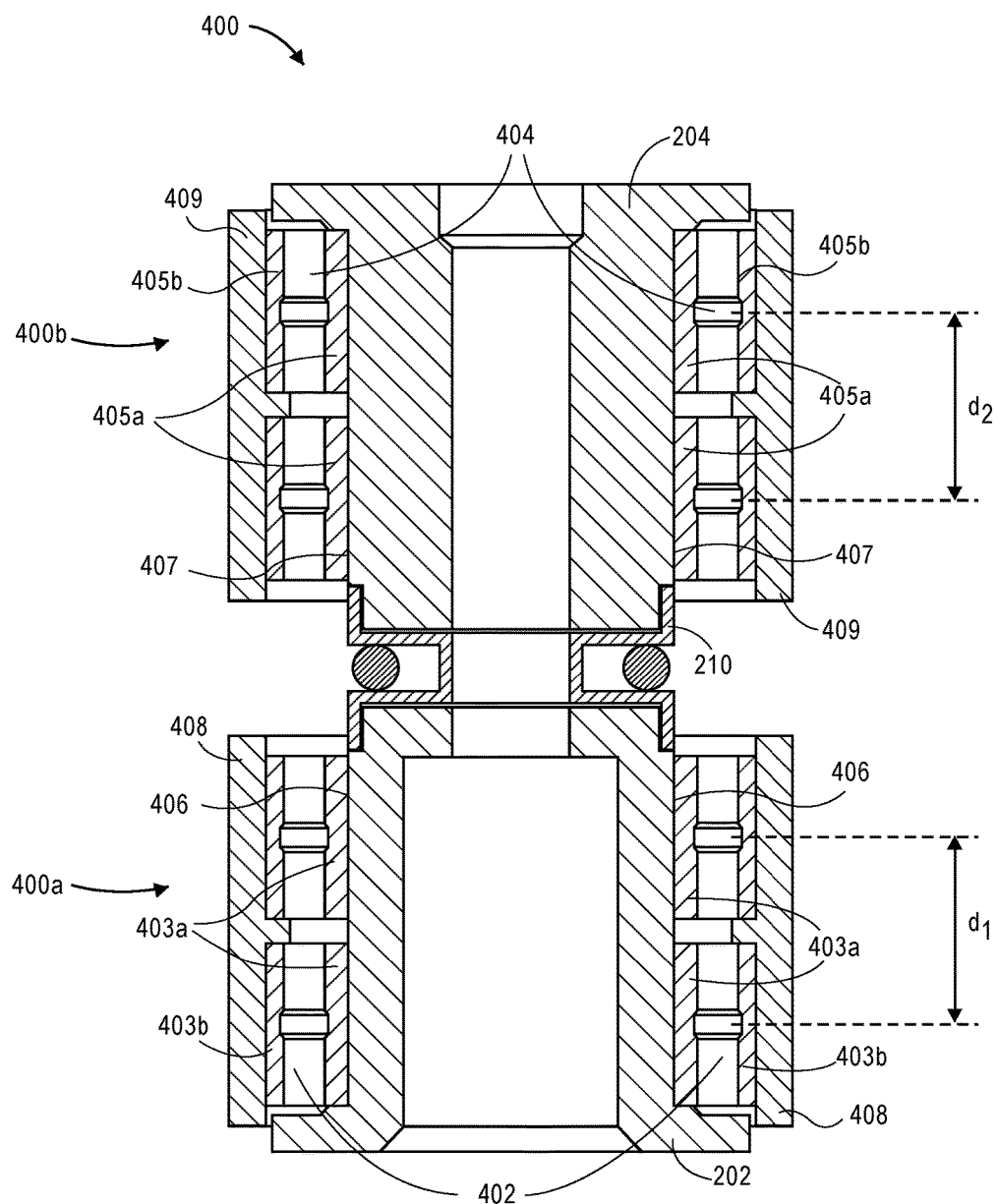
FIG. 4A is a cross-sectional side view illustrating a split-shaft pivot bearing assembly with the interface spacer assembly of FIGS. 3A and 3B, according to an embodiment.

FIG. 4A is a cross-sectional side view illustrating a split-shaft pivot bearing assembly with the interface spacer assembly of FIGS. 3A and 3B, according to an embodiment. A pivot bearing assembly, such as split-shaft pivot bearing assembly 400 of FIG. 4A, may be implemented for use in a data storage device such as a multi-actuator hard disk drive (HDD).

Pivot bearing assembly 400 comprises the lower pivot shaft 202 coupled with the upper pivot shaft 204, with the interface spacer 210 disposed therebetween. Reference is made to FIGS. 2A-3B for illustration and corresponding description for the foregoing components. Pivot bearing assembly 400 further comprises a first or lower bearing assembly 402, which may have a first bearing preload applied thereto, affixed around the lower pivot shaft 202, and a second or upper bearing assembly 404, which may have a second bearing preload applied thereto, affixed around the upper pivot shaft 204. According to an embodiment, a first bearing preload corresponding to the lower bearing assembly 402 and a second bearing preload corresponding to the upper bearing assembly 404 are different, i.e., the first bearing preload and the second bearing preload have different values. For example, lower bearing assembly 402 may have an inner race 403a or races attached to the outer surface 406 of the lower pivot shaft 202, and upper bearing assembly 404 may have an inner race 405a or races attached to the outer surface 407 of the upper pivot shaft 204, depending on a desired manufacturing process associated with assembling a dual-actuator split-shaft assembly. Note that each of the lower bearing assembly 402 and the upper bearing assembly 404, and like bearings referenced herein, may be configured as bearing assemblies comprising multiple bearings (for a non-limiting example, each bearing assembly may comprise two ball bearings, as depicted).

The manner in which the first and second bearing preloads are applied may vary from implementation to implementation, with some non-limiting procedures known in the art.

For a non-limiting example, for the lower bearing assembly 402, an axial load may be applied to the inner race 403a of a bearing (e.g., the uppermost bearing) of the bearing assembly 402, while supporting the flange 206a (FIGS. 2A, 2B) of the pivot shaft 202. The corresponding outer race 403b is affixed to an outer bearing sleeve 408, whereby the applied load is transmitted through that bearing to the other bearing (e.g., the lower bearing) of the bearing assembly 402. Similarly for the upper bearing assembly 404, an axial load may be applied to the inner race 405a of a bearing (e.g., the uppermost bearing) of the bearing assembly 404, while supporting the flange 206b (FIGS. 2A, 2B) of the pivot shaft 204. The corresponding outer race 405b is affixed to an outer bearing sleeve 409, whereby the applied load is transmitted through that bearing to the other bearing (e.g., the lower bearing) of the bearing assembly 404.

Regarding the concept of differential preloading of bearing assemblies in the context of a dual-actuator split-shaft pivot bearing assembly such as pivot bearing assembly 300, preloading a bearing assembly affects the contact angle(s) corresponding to the balls and races of a given bearing, which in turn affects the relative stiffness of the bearing (e.g., radial and axial stiffness). The stiffness of each bearing assembly 402, 404 is a characteristic of, or affects, the stiffness of the bearing and actuator system with which each bearing assembly 402, 404 may be coupled. That is, a relatively higher preload produces a relatively stiffer actuator assembly, while a relatively lower preload produces a relatively less stiff actuator assembly. Hence, effectively and collectively "tuning" the preload associated with each respective bearing assembly 402, 404 is akin to tuning the relative stiffness of each actuator assembly, which locally and particularly affects the vibration modes of each actuator assembly coupled with each respective bearing assembly 402, 404. Generally, a relatively higher bearing preload/stiffness may result in a relatively higher frequency butterfly mode of vibration, while a relatively lower bearing preload/stiffness may result in a relatively lower frequency butterfly mode of vibration.

Thus, one can appreciate that judicious selection of an appropriate preload for each bearing assembly 402, 404 can serve to move apart the respective structural resonance modes of each corresponding actuator assembly. In view of potential deleterious effects, e.g., on the operating performance of a corresponding hard disk drive, that the coupling of actuator system modes between the actuator assemblies may have when the modes overlap or are in close proximity to each other, one can further appreciate that moving apart the respective structural resonance modes may be effective in inhibiting the transmission of vibrational energy from one operating actuator assembly to the other actuator assembly in a dual-actuator split-shaft actuator system such as actuator system. Experimentation has shown that a non-trivial reduction in the coupling transfer function gains of actuator assembly/system vibration modes may be achieved by separating their resonant frequencies, which in turn can serve to combat excessive track mis-registration (TMR) within a corresponding hard disk drive.

Furthermore, the techniques described herein may be implemented using equivalent or substantially identical bearing assemblies 402, 404, but for their respective preloads, and/or substantially identical bearing mechanisms within each bearing assembly 402, 404, according to embodiments. Still further, the preload techniques described herein may be implemented independently for each of the lower pivot assembly 400a and the upper pivot assembly 400b as the parts are modular, and checks instituted by way of resonance monitoring to ensure the correct bearing stiffness of each bearing assembly 402, 404. By contrast, a single shaft design would likely need to be cured sequentially after each preload application, and ensuring that the upper and lower bearing assemblies have the desired stiffness would be more challenging to ascertain. Thus, manufacturing process times would be longer, which leads to higher large-scale manufacturing costs.

While the foregoing differential bearing preloading is at least in part directed to moving apart the respective structural resonance modes of each actuator assembly, such as the butterfly mode frequencies, the rocking or tilt modes of the actuator assemblies may also be a concern. With further reference to FIG. 4A, lower pivot assembly 400a comprises a bearing span or spacing $d_1$ and upper pivot assembly 400b comprises a bearing span or spacing $d_2$, where $d_1$ and $d_2$ represent the distance between the bearings in each respective bearing assembly 402, 404. The rocking/tilt and butterfly modes of the actuator assemblies would be effectively the same if the actuators and pivot bearings, including each bearing span, are identical and the boundary conditions (attach points of the pivot to the base and cover) are substantially the same. Hence, if the modes are at the same frequencies for the lower and upper actuator assemblies, then the modes couple strongly. According to an embodiment, bearing spacing $d_1$ of the lower bearing assembly 402 is different from bearing spacing $d_2$ of the upper bearing assembly 404. Similar to implementing different bearing preloads to advantageously affect the respective butterfly modes, one can appreciate that judicious selection of an appropriate bearing spacing $d_1$, $d_2$ for each bearing assembly 402, 404 can serve to move apart the respective structural resonance modes of corresponding actuator assemblies, such as the rocking/tilt mode frequencies.

Figure 4B:
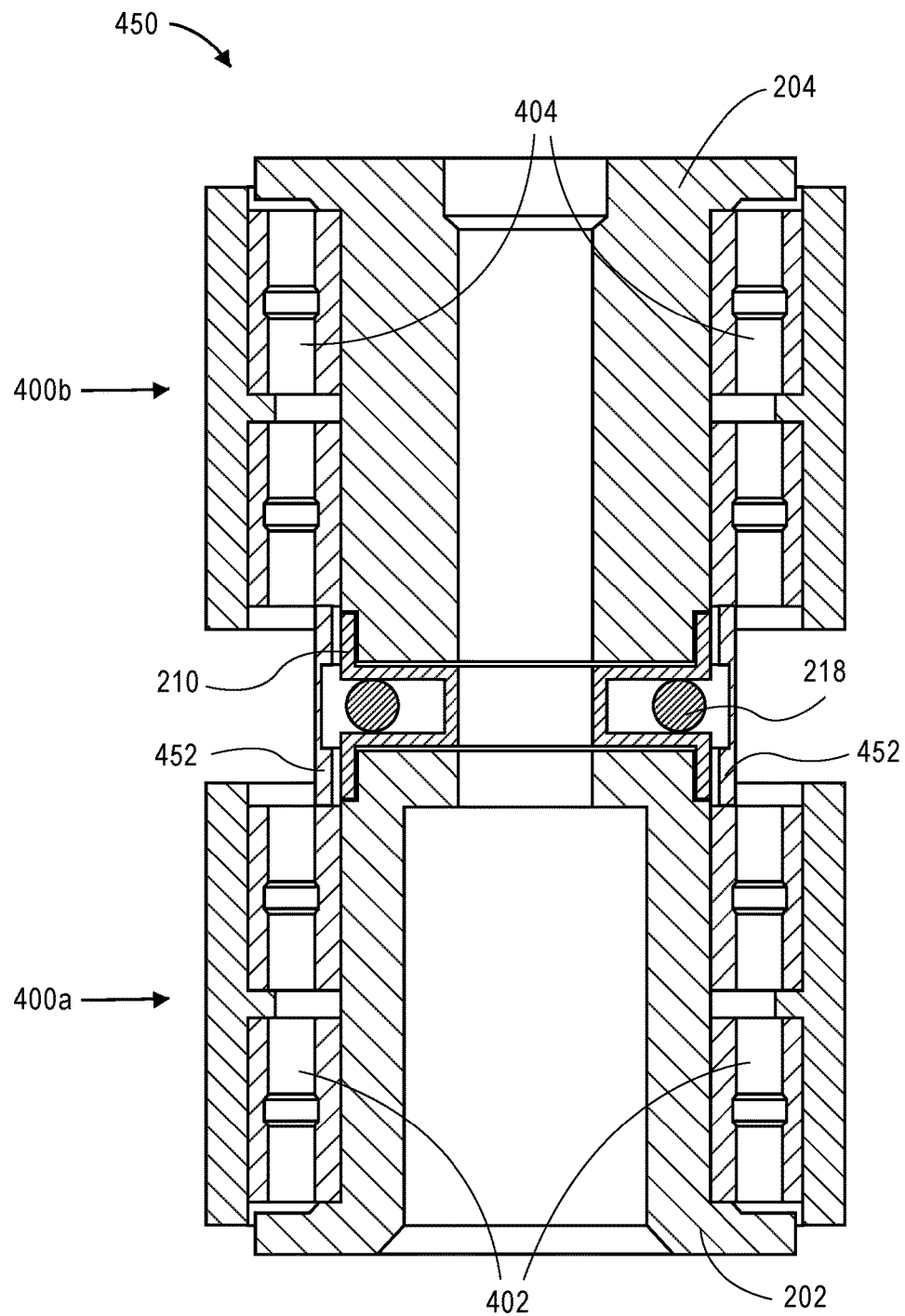
FIG. 4B is a cross-sectional side view illustrating a split-shaft pivot bearing assembly with the interface spacer assembly of FIGS. 3A and 3B, according to an embodiment.

FIG. 4B is a cross-sectional side view illustrating a split-shaft pivot bearing assembly with the interface spacer assembly of FIGS. 3A and 3B, according to an embodiment. A pivot bearing assembly, such as split-shaft pivot bearing assembly 450 of FIG. 4B, may be implemented for use in a data storage device such as a multi-actuator hard disk drive (HDD).

Similar to pivot bearing assembly 400 of FIG. 4A, a pivot bearing assembly 450 comprises the lower pivot shaft 202 coupled with the upper pivot shaft 204, with the interface spacer 210 disposed therebetween. Reference is made to FIGS. 2A-3B for illustration and corresponding description for the foregoing components. Furthermore, pivot bearing assembly 450 may comprise the same or similar lower bearing assembly 402 and upper bearing assembly 404 as does the pivot bearing assembly 400, where the differential bearing preloading and differential bearing spacing techniques described in reference to pivot bearing assembly 400 may be applied similarly to the pivot bearing assembly 450 of FIG. 4B.

However, a noteworthy difference between the configuration of pivot bearing assembly 400 and pivot bearing assembly 450 is the presence of a bearing spacer 452. According to an embodiment, the bearing spacer 452 is composed of the substantially same material as the lower and upper pivot shafts 202, 204 (e.g., steel, as in an aforementioned example). One function that bearing spacer 452 may serve is to confine or trap contaminants (such as outgassing, for a non-limiting example) that may emanate from the elastomeric damper 218 (FIGS. 3A, 3B) of the interface spacer 210. Furthermore, bearing spacer 452 may be implemented to precisely control the spacing between the two halves of pivot bearing assembly 450, i.e., the spacing between lower pivot assembly 400a and upper pivot assembly 400b. Still further, the geometry of the bearing spacer 452 may be designed with a relatively narrow cross-section in order to form a low stiffness interface between the lower and upper pivot assemblies 400a, 400b.

Figure 5A:
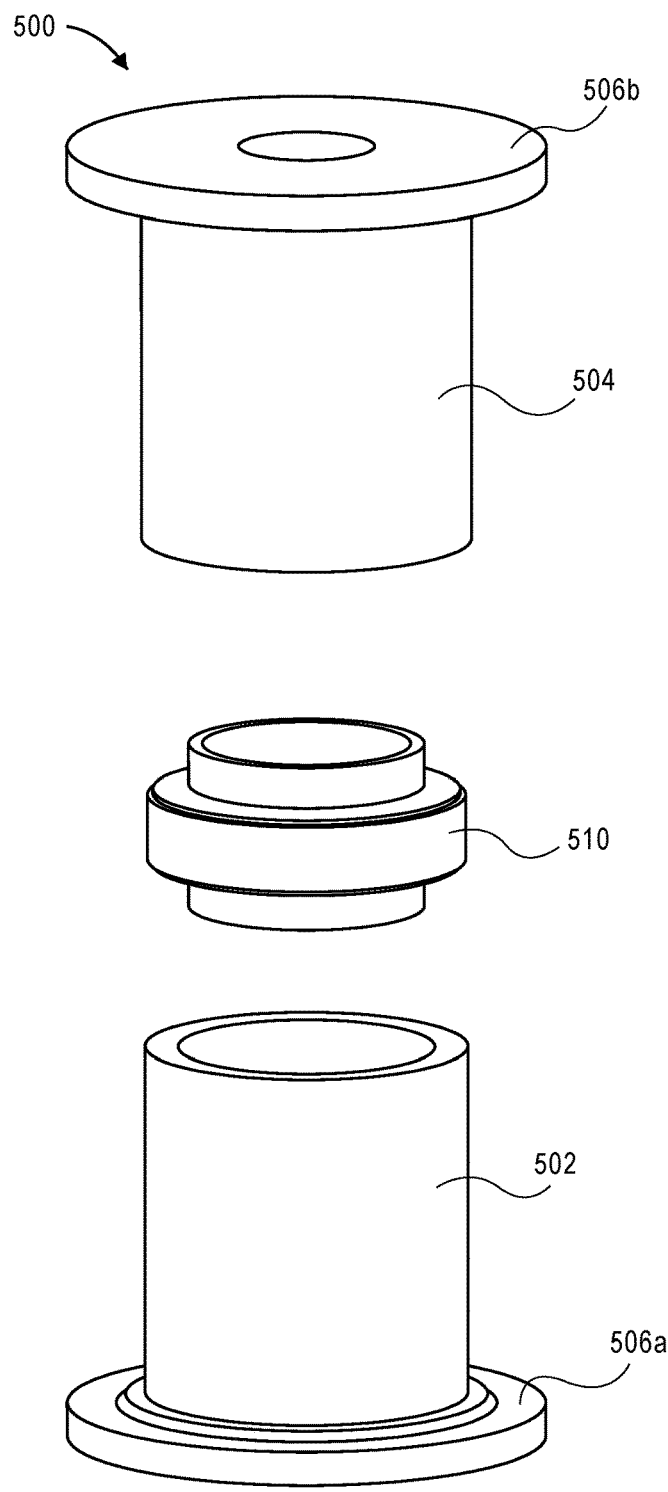
FIG. 5A is an exploded perspective view illustrating a split-shaft assembly with an interface spacer assembly, according to an embodiment.
Figure 5B:
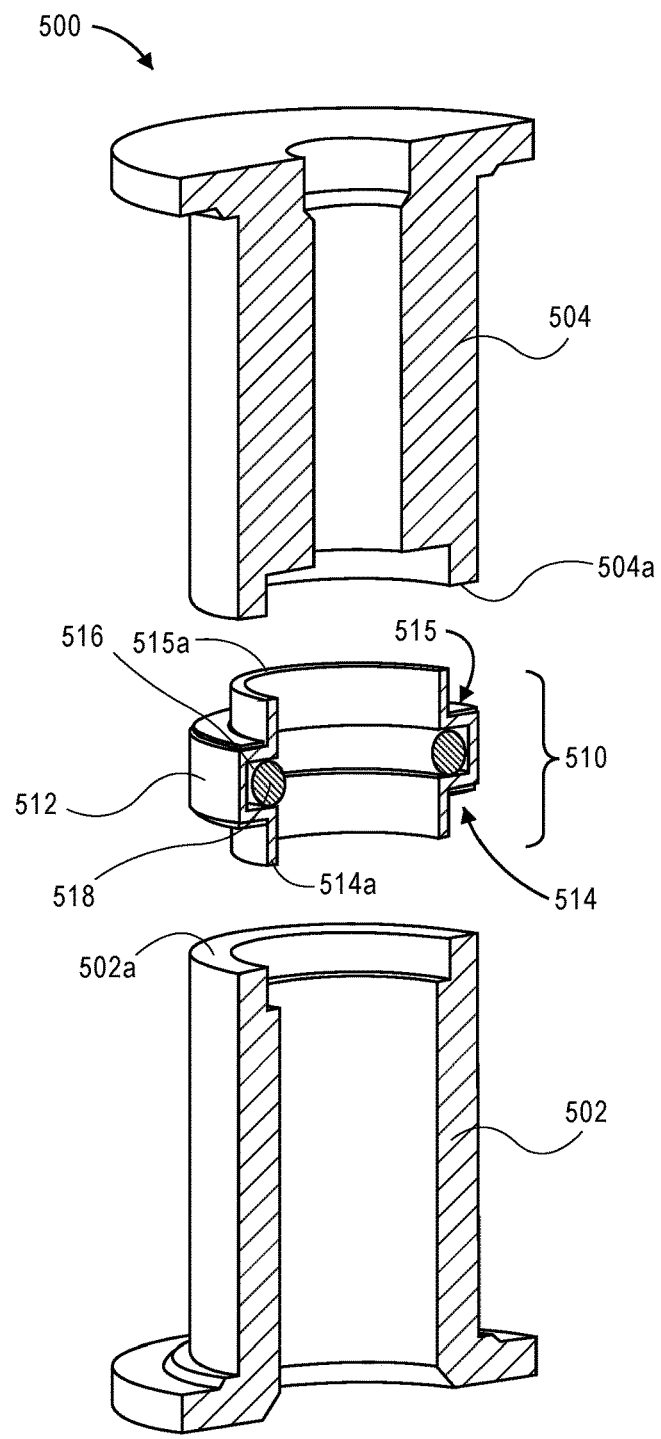
FIG. 5B is an exploded cross-sectional perspective view illustrating the split-shaft assembly with interface spacer assembly of FIG. 5A, according to an embodiment.

Dual-Actuator Split-Shaft Actuator System with
Contaminant-Contained Interface Spacer FIG. 5A is an exploded perspective view illustrating a split-shaft assembly with an interface spacer assembly, and FIG. 5B is an exploded cross-sectional perspective view illustrating the split-shaft assembly with interface spacer assembly of FIG. 5A, according to an embodiment. An actuator pivot assembly, such as split-shaft assembly 500, may be implemented for use in a data storage device such as a multi-actuator hard disk drive (HDD).

According to an embodiment, split-shaft assembly 500 (or "split-shaft pivot") comprises a first (e.g., lower) pivot shaft 502 part and a second (e.g., upper) pivot shaft 504 part. The first pivot shaft 502 and the second pivot shaft 504 are intended for coupling together as a split-shaft assembly or unit, e.g., for enabling a dual-actuator system. According to an embodiment, the first pivot shaft 502 and the second pivot shaft 504 comprise the same part, e.g., each is fabricated according to the same design.

According to an embodiment, the split-shaft assembly 500 is mounted within a disk drive by way of a post that extends from the enclosure base and that is threaded at the top. A top screw is placed through the cover and threaded into the post, which compresses the cover against the upper pivot shaft 504. The force is transmitted from the upper pivot shaft 504 to the lower pivot shaft 502, and clamps the two pivot shafts 502, 504 together in the process. According to an embodiment, the attachment flange 506a and the attachment flange 506b are (substantially) structurally equivalent or structurally symmetric. Thus, when the lower pivot shaft 502 is coupled with an HDD enclosure base (e.g., base or housing 168 of FIG. 1) with support from the lower attachment flange 506a, and the upper pivot shaft 504 is coupled with an HDD cover with support from the upper attachment flange 506b, a higher degree of stiffness symmetry can be achieved at the base and cover interfaces as compared to using asymmetric flanges. Again, such stiffness symmetry at the attachment boundaries can assist with inhibiting undesirable modes such as tilt modes of the actuators wherein the displacement gain at the head 110a (FIG. 1) varies depending on the position in the HSA.

According to an embodiment, split-shaft assembly 500 further comprises a compliant "contaminant-contained" interface spacer 510 coupled with and between the first and second pivot shafts 502, 504. According to an embodiment, the interface spacer 510 is a separate component from each of the first and second pivot shafts 502, 504. As with interface spacer 210 (FIGS. 2A-3B), interface spacer 510 may be composed of a different material than the first and second pivot shafts 502, 504 for which the interface spacer 510 is used to couple. For example and according to an embodiment, each of the first and second shaft 502, 504 is composed of a first material having a first elastic modulus and the housing (see, e.g., housing 512 of FIGS. 5A, 5B) of the interface spacer 510 is composed of a second material having a second elastic modulus that is lower than the first elastic modulus. For example and according to an embodiment, the first pivot shaft 502 and the second pivot shaft 504 are each made primarily of steel and the housing 512 of interface spacer 510 is made primarily of aluminum. Alternatively, according to an embodiment, the interface spacer 510 may be composed of the same material as the first and second pivot shafts 502, 504, e.g., in order to match the respective coefficients of thermal expansion of the components.

FIG. 6A is an exploded perspective view illustrating an interface spacer assembly, and FIG. 6B is a cross-sectional perspective view illustrating the interface spacer assembly of FIG. 6A, according to an embodiment. According to an embodiment, the interface spacer 510 comprises an annular housing 512 (or "housing 512") that may have a bore therethrough. The housing 512 comprises a first receiving structure 514 (or "receptacle") at one end, for receiving an end 502a or extension of the first (e.g., lower) pivot shaft 502, and a second receiving structure (or "receptacle") 515 at another opposing end of the housing 512, for receiving an end 504a or extension of the second pivot shaft 504. The housing 512 further comprises an annular slot 516 or channel circumscribing the housing 512 (or bore), between the first and second receiving structures 514, 515. As such, the annular slot 516 extends outward away from the center bore (e.g., as depicted in FIGS. 5B, 6B), and each first and second receiving structure 514, 515 comprises an inner wall 514a, 515a (e.g., as depicted in FIGS. 5B, 6B), for mechanically supporting the reception of end 502a and the end 504a, respectively.

According to an embodiment, the interface spacer 510 further comprises an elastomeric damper 518 (e.g., an O-ring) positioned within the annular slot 516 and between the first and second receiving structures 514, 515, and is pre-compressed during assembly, where a non-limiting compression target may range from 10% to 30%. An appropriate elastomeric material may be selected based on, for non-limiting examples, desired damping characteristics over a desired frequency range and temperature range (e.g., based on loss factor), cleanliness requirements (e.g., considering outgassing), elasticity (e.g., based on shear modulus), and the like. Such an elastomeric damper 518 may serve to dissipate energy from cyclic deformation (e.g., bending) of the pivot shaft 500 in response to operational vibrational forces and shock events, for example. As such, deformation of the compliant interface spacer 510 (e.g., deflection of the housing 512) is likely to cause strain variations in the elastomeric damper 518, which serve to dissipate vibrational energy within the elastomer as heat. The interface spacer 510 is considered "contaminant-contained" at least in part because the elastomeric damper 518 is disposed and contained within the annular slot 516, thereby containing, confining, trapping contaminants (such as outgassing, for a non-limiting example) that may emanate from the elastomeric damper 518 of the interface spacer 510.

According to an embodiment, the interface spacer 510 further comprises a first viscoelastic damper 520 disposed in the first receiving structure 514 and mechanically interfacing with the first pivot shaft 502, and a second viscoelastic damper 521 disposed in the second receiving structure 515 and mechanically interfacing with the second pivot shaft 504. Each of the first and second viscoelastic dampers 520, 521 provide additional damping at the interface, e.g., functioning as constrained layer dampers, generally, between the housing 512 of the interface spacer 510 and each respective end 502a, 504a of the first and second pivot shafts 502, 504. According to an embodiment, one or more viscoelastic damper 520, 521 comprises a laminate structure comprising a steel annulus coupled with a viscoelastic adhesive (e.g., a pressure-sensitive adhesive, or "PSA") on each side, used to attach the interface spacer 510 to the end 502a, 504a of each of the first and second pivot shafts 502, 504. An appropriate viscoelastic material may be selected based on, for non-limiting examples, desired damping characteristics over a desired frequency range and temperature range (e.g., based on loss factor), cleanliness requirements (e.g., considering outgassing), and the like. Further, according to an embodiment, the viscoelastic adhesive employed on one side of the steel annulus may be different, and thus have different characteristics and qualities, than the viscoelastic adhesive employed on the other side of the steel annulus.

Figure 7:
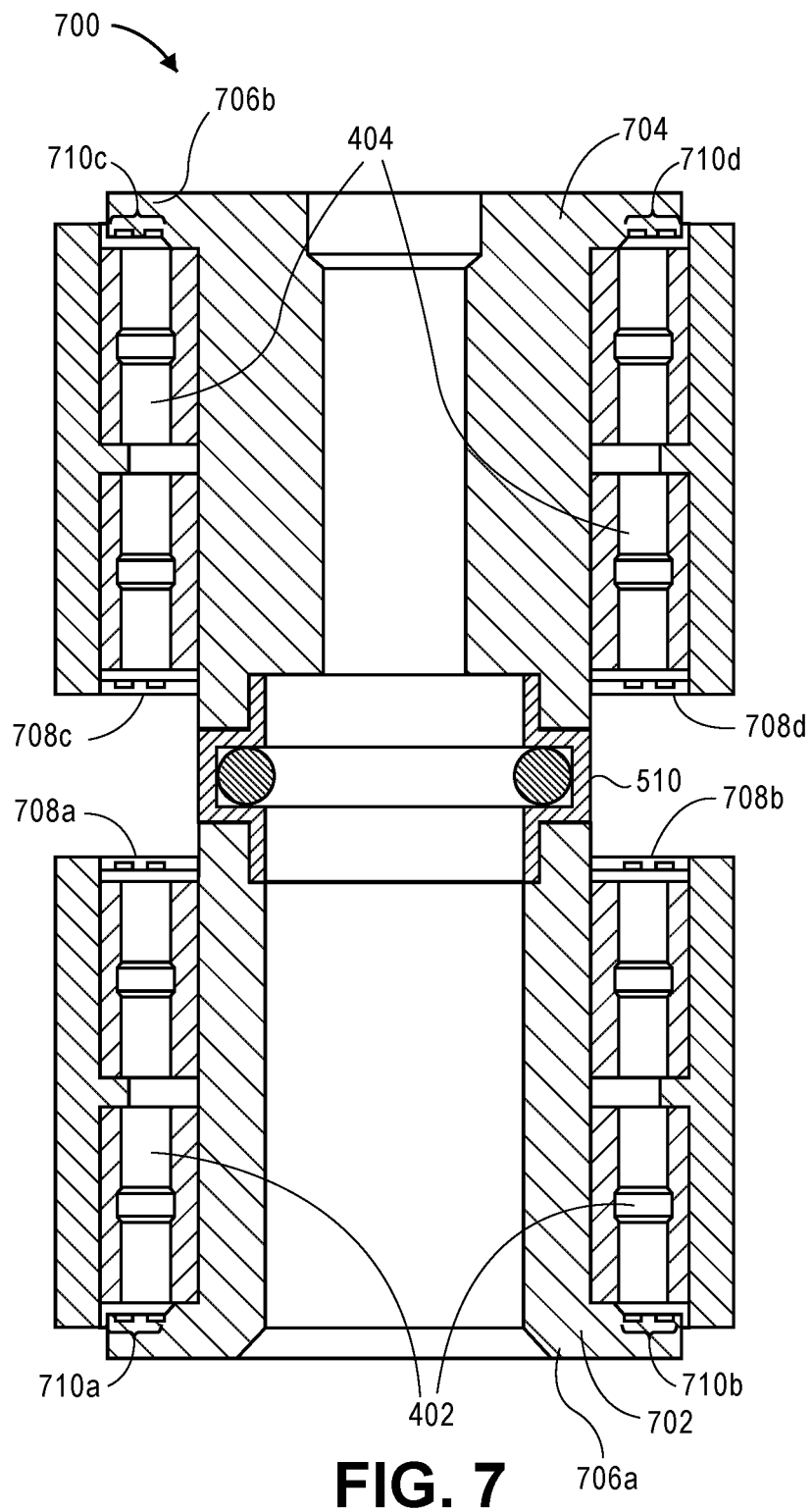
FIG. 7 is a cross-sectional side view illustrating a split-shaft pivot bearing assembly with the interface spacer assembly of FIGS. 6A and 6B, according to an embodiment.

Dual-Actuator Split-Shaft Actuator Bearing Assembly with Contamination Mitigation FIG. 7 is a cross-sectional side view illustrating a split-shaft pivot bearing assembly with the interface spacer assembly of FIGS. 6A and 6B, according to an embodiment. A pivot bearing assembly, such as split-shaft pivot bearing assembly 700 of FIG. 7, may be implemented for use in a data storage device such as a multi-actuator hard disk drive (HDD).

Pivot bearing assembly 700 comprises a first or lower pivot shaft 702 coupled with a second or upper pivot shaft 704, with the interface spacer 510 disposed therebetween. Lower pivot shaft 702 and upper pivot shaft 704 may be the same as or similar to lower pivot shaft 502 and upper pivot shaft 504, respectively, except for some contamination mitigation features described elsewhere herein. Reference is made to FIGS. 5A-6B for illustration and corresponding description for the foregoing like components. Similar to pivot bearing assembly 400 of FIG. 4A, pivot bearing assembly 700 may comprise the same or similar lower bearing assembly 402 and upper bearing assembly 404 as does the pivot bearing assembly 400 (and pivot bearing assembly 450 of FIG. 4B), where the differential bearing preloading and differential bearing spacing techniques described in reference to pivot bearing assembly 400 may be applied similarly to the pivot bearing assembly 700 of FIG. 7.

However, besides the depiction of interface spacer 510 instead of interface spacer 210, one difference between the configuration of pivot bearing assembly 400 and pivot bearing assembly 700 is the presence of a bearing hub cap 708a, a bearing hub cap 708b, a bearing hub cap 708c, and a bearing hub cap 708d, positioned adjacent to or coupled with a respective bearing assembly 402 or 404 (e.g., bonded to the bearing sleeve), or press fit onto each respective first and/or second shaft 702, 704. As depicted, bearing hub caps 708a, 708b are annular hub caps coupled with or adjacent to the top of the lower bearing assembly 402 and bearing hub caps 708c, 708d are annular hub caps coupled with or adjacent to the bottom of the upper bearing assembly 404. Use of bearing hub caps 708a, 708b, 708c, 708d can assist with inhibiting or mitigating the migration of hydrocarbon contamination from pivot grease in each of the lower bearing assembly 402 and upper bearing assembly 404. It is appreciated that the foregoing approach to hydrocarbon mitigation can also be applied to any of the other pivot shaft and pivot bearing assemblies illustrated and described herein, such as those depicted in FIGS. 4A, 4B, 8B, 9B.

Another difference between the configuration of pivot bearing assembly 400 and pivot bearing assembly 700 is the presence of a series of concentric grooves 710a, 710b formed along the top of flange 706a of pivot shaft 702, and a series of concentric grooves 710c, 710d formed along the bottom of flange 706b of pivot shaft 704. As depicted, concentric grooves 710a, 710b are adjacent to the bottom of the lower bearing assembly 402 and concentric grooves 710c, 710d are adjacent to the top of the upper bearing assembly 404. Use of concentric grooves 710a, 710b, 710c, 710d forms a labyrinth structure that can assist with inhibiting or mitigating the migration of contaminants from each of the lower bearing assembly 402 and upper bearing assembly 404. It is appreciated that the foregoing approach to contaminant mitigation can also be applied to any of the other pivot shaft and pivot bearing assemblies illustrated and described herein, such as those depicted in FIGS. 4A, 4B, 8B, 9B.

Additional Interface Spacer Configurations

Figure 8A:
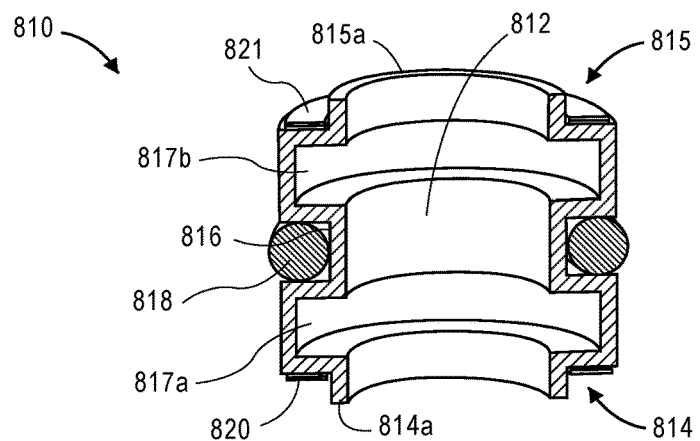
FIG. 8A is a cross-sectional perspective view illustrating an interface spacer assembly, according to an embodiment.
Figure 8B:
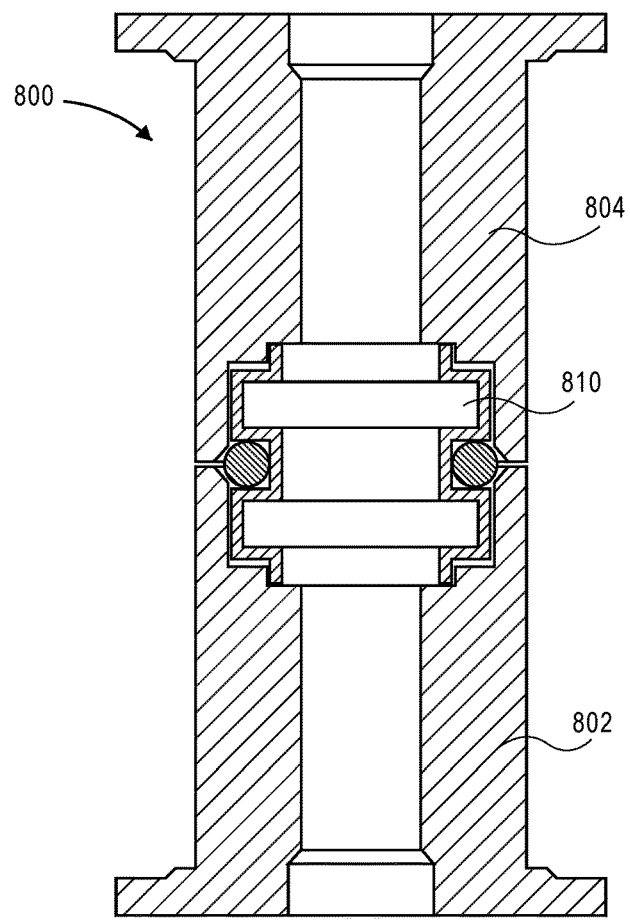
FIG. 8B is a cross-sectional side view illustrating a symmetric split-shaft pivot assembly with the interface spacer assembly of FIG. 8A, according to an embodiment.

FIG. 8A is a cross-sectional perspective view illustrating an interface spacer assembly, and FIG. 8B is a cross-sectional side view illustrating a symmetric split-shaft pivot assembly with the interface spacer assembly of FIG. 8A, according to an embodiment. Split shaft assembly 800 comprises a first or lower pivot shaft 802 coupled with a second or upper pivot shaft 804 by way of an interface spacer 810.

Interface spacer 810 may be utilized as an alternative to, and used similarly as, other interface spacers illustrated and described elsewhere herein (e.g., interface spacers 210, 510), thereby providing more design freedom. With reference to interface spacer 210 (see, e.g., FIG. 3B), interface spacer 810 is similarly configured with a first annular channel 816 extending inward toward the center or bore, with an elastomeric damper 818 disposed therein, and further comprises a second annular channel 817a extending outward away from the center bore and positioned between the first annular channel 816 and a first receptacle 814, and a third annular channel 817b extending outward away from the center bore and positioned between the first annular channel 816 and a second receptacle 815. Note that the interface spacer 810 is depicted as coupling together symmetric lower and upper pivot shafts 802, 804, however, interface spacer 810 may be implemented with asymmetric pivot shafts such as depicted in FIGS. 4A, 4B, and 7. Likewise, each interface spacer 210 and 510 may be implemented with symmetric pivot shafts such as lower and upper pivot shafts 802, 804.

Figure 9A:
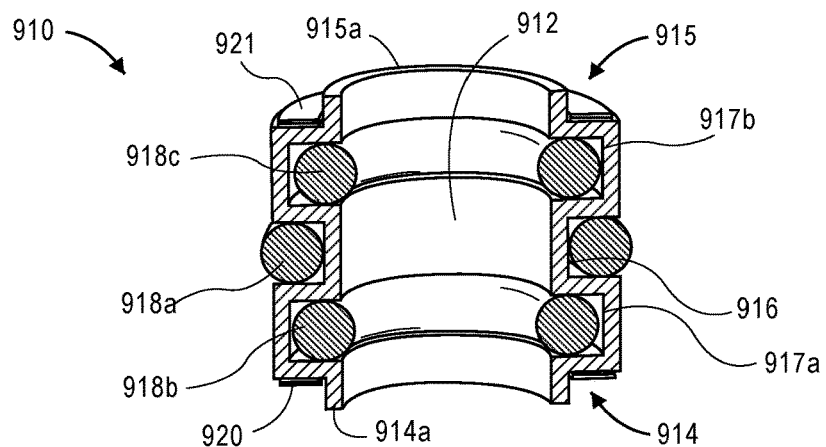
FIG. 9A is a cross-sectional perspective view illustrating an interface spacer assembly, according to an embodiment.
Figure 9B:
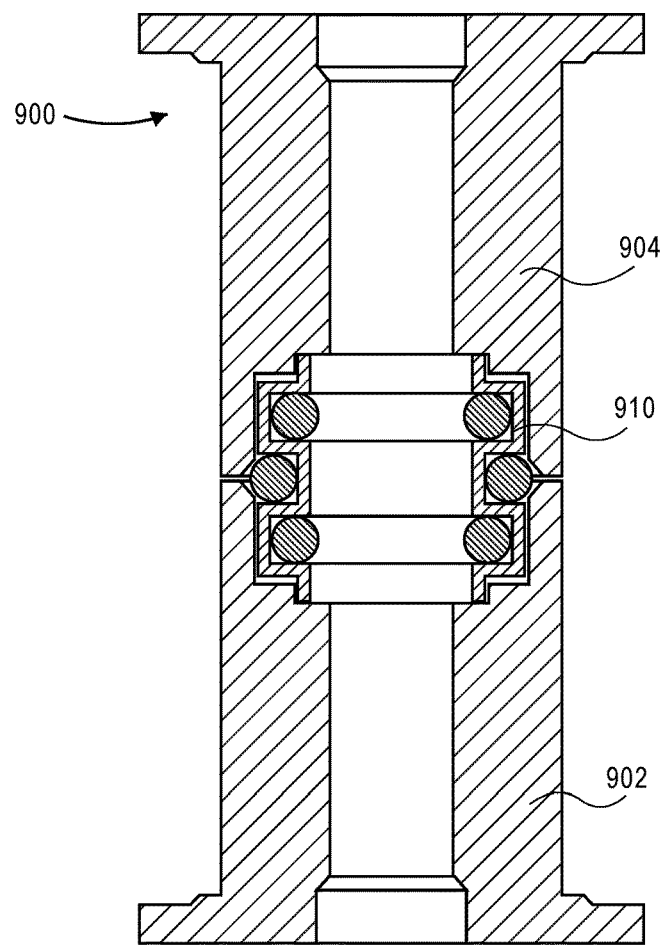
FIG. 9B is a cross-sectional side view illustrating a symmetric split-shaft pivot assembly with the interface spacer assembly of FIG. 9A, according to an embodiment.

FIG. 9A is a cross-sectional perspective view illustrating an interface spacer assembly, and FIG. 9B is a cross-sectional side view illustrating a symmetric split-shaft pivot assembly with the interface spacer assembly of FIG. 9A, according to an embodiment. Split shaft assembly 900 comprises a first or lower pivot shaft 902 coupled with a second or upper pivot shaft 904 by way of an interface spacer 910.

Interface spacer 910 may be utilized as an alternative to, and used similarly as, other interface spacers illustrated and described elsewhere herein (e.g., interface spacers 210, 510, 810), thereby providing more design freedom. With reference to interface spacer 810 (see, e.g., FIGS. 8A, 8B), interface spacer 910 is similarly configured with a first annular channel 916 extending inward toward the center or bore and with a first elastomeric damper 918a disposed therein, a second annular channel 917a extending outward away from the center bore and positioned between the first annular channel 916 and a first receptacle 914, and a third annular channel 917b extending outward away from the center bore and positioned between the first annular channel 916 and a second receptacle 915. Interface spacer 910 further comprises a second elastomeric damper 918b positioned within the second annular channel 917a and a third elastomeric damper 918c positioned within the third annular channel 917b. Note that the interface spacer 910 is depicted as coupling together symmetric lower and upper pivot shafts 902, 904, however, interface spacer 910 may be implemented with asymmetric pivot shafts such as depicted in FIGS. 4A, 4B, and 7.

Dual-Actuator Split-Shaft Actuator System without Interface Spacer

According to an embodiment, one approach to reducing the dynamic coupling between actuator systems in a dual-actuator configuration is to utilize contact area(s) at the interface between shafts of a split-shaft assembly, to enable some energy dissipation during vibration.

Figure 10B:
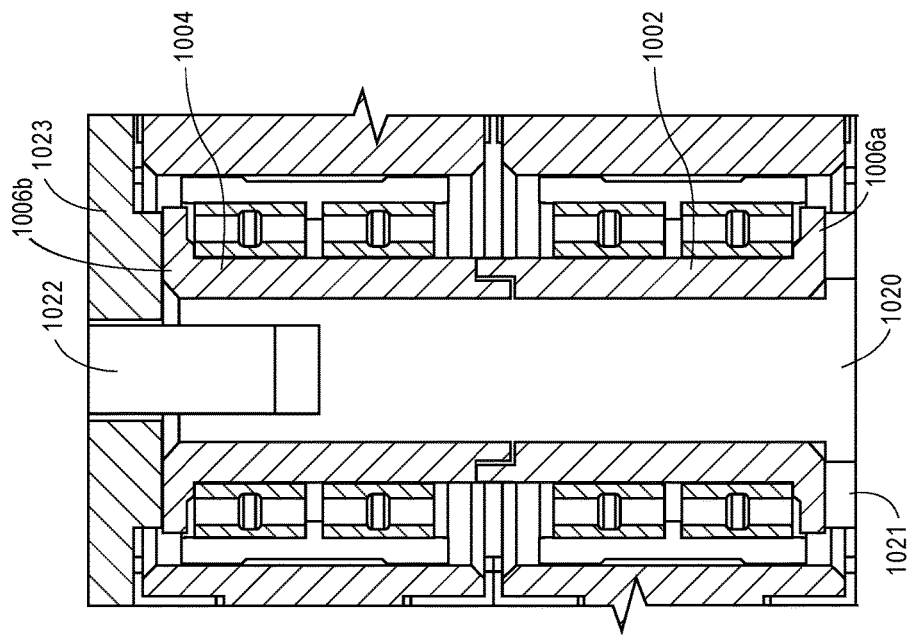
FIG. 10B is a cross-sectional side view illustrating an attachment technique for the split-shaft assembly of FIG. 10A, according to an embodiment.
Figure 10A:
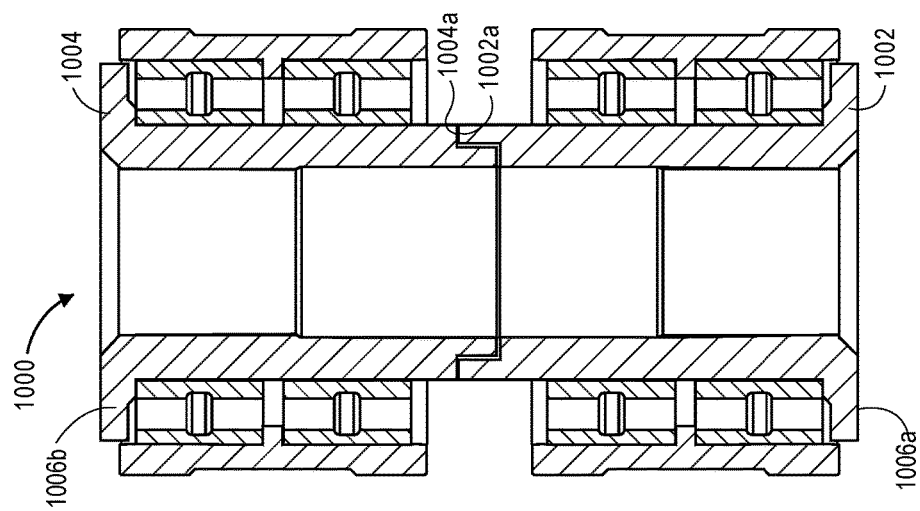
FIG. 10A is a cross-sectional side view illustrating a split-shaft assembly without an interface spacer assembly, according to an embodiment.

FIG. 10A is a cross-sectional side view illustrating a split-shaft assembly without an interface spacer assembly, and FIG. 10B is a cross-sectional side view illustrating an attachment technique for the split-shaft assembly of FIG. 10A, according to an embodiment. An actuator pivot assembly, such as split-shaft assembly 1000, may be implemented for use in a data storage device such as a multi-actuator hard disk drive (HDD).

According to an embodiment, split-shaft assembly 1000 (or "split-shaft pivot") comprises a first (e.g., lower) pivot shaft 1002 part and a second (e.g., upper) pivot shaft 1004 part. The first pivot shaft 1002 and the second pivot shaft 1004 are intended for mating together as a split-shaft assembly or unit, e.g., for enabling a dual-actuator system.

According to an embodiment, the split-shaft pivot 1000 is mounted within a disk drive by way of a post 1020 that extends from the enclosure base 1021 (e.g., base or housing 168 of FIG. 1) and that is threaded at the top. A top screw 1022 is placed through the cover 1023 and threaded into the post 1020, which compresses the cover 1023 against the upper pivot shaft 1004. The force is transmitted from the upper pivot shaft 1004 to the lower pivot shaft 1002, and clamps the two pivot shafts 1002, 1004 together along the horizontal areas (contact area) of the outer diameter regions of the mating shaft surface 1002a of pivot shaft 1002 and shaft surface 1004a of pivot shaft 1004. Further friction at the interface by way of micro-slip of the contact regions enables some energy dissipation during vibration. According to an embodiment, the attachment flange 1006a and the attachment flange 1006b are (substantially) structurally equivalent or structurally symmetric. Thus, when the first pivot shaft 1002 is coupled with an HDD enclosure base 1021 with support from the lower attachment flange 1006a, and the second pivot shaft 1004 is coupled with an HDD cover 1023 with support from the upper attachment flange 1006b, a higher degree of stiffness symmetry can be achieved at the base and cover interfaces as compared to using asymmetric flanges. Such stiffness symmetry at the attachment boundaries can assist with inhibiting undesirable modes such as tilt modes of the actuators, wherein the displacement gain at the head 110a (FIG. 1) varies depending on the position in the HSA.

Extensions and Alternatives

While embodiments, techniques and approaches are described herein throughout in the context of a dual-actuator system, it is contemplated and one can appreciate that these embodiments, techniques and approaches may be similarly applied to and implemented in multi-actuator systems, generally. That is, the number of actuators or actuator assemblies in a multi-actuator system in which the described embodiments, techniques and approaches may be implemented is not limited to two.

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage device comprising:
a plurality of recording disk media rotatably mounted on a spindle;
a first head slider comprising a read-write transducer configured to write to and to read from one disk media of said plurality of disk media;
a first rotary actuator assembly configured to move said first head slider to access portions of said one disk media;
a first shaft part around which said first rotary actuator assembly is rotatably coupled;
a second head slider comprising a read-write transducer configured to write to and to read from another disk media of said plurality of disk media;
a second rotary actuator assembly configured to move said second head slider to access portions of said another disk media;
a second shaft part around which said second rotary actuator assembly is rotatably coupled; and
an interface spacer coupled with and between said first shaft part and said second shaft part, wherein said interface spacer comprises:
an annular housing with a bore therethrough, wherein said housing includes:
a first receptacle at one end for receiving an extension of said first shaft part,
a second receptacle at another opposing end for receiving an extension of said second shaft part, and
an annular channel circumscribing said bore between said first and second receptacles; and
an elastomeric O-ring positioned within said annular channel and between said first and second receptacles.

2. The data storage device of claim 1, wherein each of said first and second shaft parts is composed of a first material having a first elastic modulus, and wherein said annular housing of said interface spacer is composed of a second material having a second elastic modulus that is lower than said first elastic modulus.

3. The data storage device of claim 2, wherein said first material is substantially steel and said second material is substantially aluminum.

4. The data storage device of claim 1, wherein each of said first shaft part, said second shaft part, and said interface spacer is composed of a same material.

5. The data storage device of claim 1, wherein said interface spacer further comprises:
a first viscoelastic damper disposed in said first receptacle and a second viscoelastic damper disposed in said second receptacle.

6. The data storage device of claim 1, wherein said annular channel extends inward toward said bore.

7. The data storage device of claim 6, wherein each of said first and second receptacles comprises an outer wall.

8. The data storage device of claim 1, wherein said annular channel extends outward away from said bore.

9. The data storage device of claim 8, wherein each of said first and second receptacles comprises an inner wall.

10. The data storage device of claim 1, wherein said annular channel is a first annular channel extending inward toward said bore, and wherein said housing of said interface spacer further comprises:
a second annular channel extending outward away from said bore and positioned between said first annular channel and said first receptacle; and
a third annular channel extending outward away from said bore and positioned between said first annular channel and said second receptacle.

11. The data storage device of claim 10, wherein said elastomeric O-ring is a first elastomeric O-ring, and wherein said interface spacer further comprises:
a second elastomeric O-ring positioned within said second annular channel; and
a third elastomeric O-ring positioned within said third annular channel.

12. The data storage device of claim 1, further comprising
a first bearing assembly, with a first bearing preload applied, interposed between said first shaft part and said first rotary actuator assembly; and
a second bearing assembly, with a second bearing preload applied, interposed between said second shaft part and said second rotary actuator assembly;
wherein said first bearing preload is different from said second bearing preload.

13. The data storage device of claim 12, wherein each of said first and second bearing assemblies comprises a pair of bearings, and wherein said first bearing assembly comprises a first bearing spacing and said second bearing assembly comprises a second bearing spacing that is different from said first bearing spacing.

14. The data storage device of claim 12, wherein:
said first shaft part comprises a first mounting flange having a bottom surface for structurally mating with a data storage device base and a top opposing said bottom surface;
said second shaft part comprises a second mounting flange having a top surface for structurally mating with a data storage device cover and a bottom opposing said top surface;
said top of said first mounting flange comprises a series of concentric grooves to form a labyrinth structure to inhibit migration of contaminants from said first bearing assembly; and
said bottom of said second mounting flange comprises a series of concentric grooves to form a labyrinth structure to inhibit migration of contaminants from said second bearing assembly.

15. The data storage device of claim 1, wherein said first and second shaft parts are structurally equivalent parts.

16. A hard disk drive actuator pivot assembly comprising:
a first pivot shaft around which a first bearing assembly is affixed;
a second pivot shaft around which a second bearing assembly is affixed;
an interface spacer coupled with and between said first pivot shaft and said second pivot shaft, wherein said interface spacer comprises:
a housing with a bore therethrough, said housing comprising:
a first receiving structure at one end for receiving an end of said first pivot shaft,
a second receiving structure at another opposing end of said housing for receiving an end of said second pivot shaft, and
an annular slot circumscribing said housing between said first and second receiving structures; and
an elastomeric damper positioned within said annular slot and between said first and second receiving structures.

17. The hard disk drive actuator pivot assembly of claim 16, wherein each of said first and second pivot shafts is composed of a first material having a first elastic modulus, and wherein said housing of said interface spacer is composed of a second material having a second elastic modulus that is lower than said first elastic modulus.

18. The hard disk drive actuator pivot assembly of claim 16, wherein each of said first pivot shaft, said second pivot shaft, and said interface spacer is composed of a same material.

19. The hard disk drive actuator pivot assembly of claim 16, wherein said first and second pivot shafts are substantially equivalent parts.

20. The hard disk drive actuator pivot assembly of claim 16, wherein said interface spacer further comprises:
a first viscoelastic damper disposed in said first receiving structure and mechanically interfacing with said first pivot shaft; and
a second viscoelastic damper disposed in said second receiving structure and mechanically interfacing with said second pivot shaft.

21. The hard disk drive actuator pivot assembly of claim 16, wherein said annular slot extends inward toward said bore, and wherein each of said first and second receiving structures comprises an outer wall.

22. The hard disk drive actuator pivot assembly of claim 16, wherein said annular slot extends outward away from said bore, and wherein each of said first and second receiving structures comprises an inner wall.

23. The hard disk drive actuator pivot assembly of claim 16, wherein said first pivot shaft and said first bearing assembly are constituent to a lower pivot bearing assembly and said second pivot shaft and said second bearing assembly are constituent to an upper pivot bearing assembly, and wherein said actuator pivot assembly further comprises:
a first annular hub cap coupled to the top of said first bearing assembly, configured to inhibit hydrocarbon migration from pivot grease in said first bearing assembly; and a second annular hub cap coupled to the bottom of said second bearing assembly, configured to inhibit hydrocarbon migration from pivot grease in said second bearing assembly.

24. The hard disk drive actuator pivot assembly of claim 16, wherein said first bearing assembly is set with a first bearing preload and said second bearing assembly is set with a second bearing preload that is different from said first bearing preload.

25. The hard disk drive actuator pivot assembly of claim 16, wherein each of said first and second bearing assemblies comprises a pair of bearings, and wherein said first bearing assembly comprises a first bearing span and said second bearing assembly comprises a second bearing span that is different from said first bearing span.

26. A hard disk drive comprising the actuator pivot assembly of claim 16.

27. A data storage device comprising:
a first magnetic recording medium;
first means for writing to and reading from said first magnetic recording medium;
first means for moving said first means for writing and reading to access said first magnetic recording medium;
first means for supporting said first means for moving;
a second magnetic recording medium;
second means for writing to and reading from said second magnetic recording medium;
second means for moving said second means for writing and reading to access said second magnetic recording medium;
second means for supporting said second means for moving, said second means for supporting being separate from said first means for supporting; and
annular means for spacing said first means for supporting from said second means for supporting, wherein said annular means for spacing comprises channel means for receiving an elastomeric O-ring positioned therein.

28. A data storage device comprising:
a plurality of recording disk media rotatably mounted on a spindle;
a first head slider comprising a read-write transducer configured to write to and to read from one disk media of said plurality of disk media;
a first rotary actuator assembly configured to move said first head slider to access portions of said one disk media;
a first shaft part around which said first rotary actuator assembly is rotatably coupled;
a second head slider comprising a read-write transducer configured to write to and to read from another disk media of said plurality of disk media;
a second rotary actuator assembly configured to move said second head slider to access portions of said another disk media;
a second shaft part around which said second rotary actuator assembly is rotatably coupled;
an interface spacer coupled with and between said first shaft part and said second shaft part;
a first bearing assembly, with a first bearing preload applied, interposed between said first shaft part and said first rotary actuator assembly; and
a second bearing assembly, with a second bearing preload applied, interposed between said second shaft part and said second rotary actuator assembly;
wherein said first bearing preload is different from said second bearing preload.

* * * * *